(12) United States Patent
Anderson et al.

(10) Patent No.: US 7,296,327 B2
(45) Date of Patent: Nov. 20, 2007

(54) BUCKLE ASSEMBLY

(75) Inventors: Jeffrey D. Anderson, Wolcott, CT (US); Ryan T. Jump, East Hampton, CT (US)

(73) Assignee: Illinois Tool Works Inc., Glenview, IL (US)

( * ) Notice: Subject to any disclaimer, the term of this patent is extended or adjusted under 35 U.S.C. 154(b) by 43 days.

(21) Appl. No.: 11/315,037

(22) Filed: Dec. 22, 2005

(65) Prior Publication Data

US 2006/0185131 A1    Aug. 24, 2006

Related U.S. Application Data

(60) Provisional application No. 60/655,098, filed on Feb. 22, 2005.

(51) Int. Cl.
*A44B 11/06*    (2006.01)

(52) U.S. Cl. .................. 24/171; 24/196; 24/265 BC

(58) Field of Classification Search ............. 280/801.1, 280/808; 297/468, 483; 24/171, 194, 196, 24/265 BC
See application file for complete search history.

(56) References Cited

U.S. PATENT DOCUMENTS

| | | | |
|---|---|---|---|
| 2,053,600 A | | 9/1936 | Camp |
| 4,009,510 A | * | 3/1977 | Lindblad ..................... 24/196 |
| 4,549,769 A | | 10/1985 | Pilarski |
| 4,762,338 A | | 8/1988 | Hayden |
| 5,054,815 A | | 10/1991 | Gavagan |

* cited by examiner

*Primary Examiner*—James R. Brittain
(74) *Attorney, Agent, or Firm*—Mark W. Croll; Paul F. Donovan

(57) ABSTRACT

A buckle assembly includes a clip configured to be secured to a structure, a strap frame rotatably secured to the clip, and a spring member. The strap frame may be rotated with respect to the clip. The spring member exerts a constant force into the strap frame, wherein the constant force maintains the strap frame in an aligned orientation with respect to the clip.

16 Claims, 6 Drawing Sheets

BUCKLE ASSEMBLY

RELATED APPLICATIONS

This application relates to and claims priority benefits from U.S. Provisional Patent Application 60/655,098 entitled "Buckle," filed Feb. 22, 2005, which is incorporated by reference herein in its entirety.

FIELD OF THE INVENTION

Embodiments of the present invention generally relate to a buckle assembly, and more particularly to a buckle assembly that is adapted to allow adjustment of an associated webbing or strap.

BACKGROUND OF THE INVENTION

FIG. 1 illustrates a conventional buckle assembly 10 secured to a structure 12, such as a portion of a car seat. The conventional buckle assembly 10 includes a clip 14 secured to the structure 12 through a fastener 15, such as a screw or bolt, and a strap frame 16 that is rotatably retained by the clip 14. The strap frame 16 includes a clip bar 18 that is rotatably secured within a channel of the clip 14. The clip bar 18 is integrally connected to lateral posts 20, which are in turn integrally connected to a strap bar 22. A strap passage 24 is defined between the clip 14, the lateral posts 20 and the strap bar 22.

A slide bar 26 is slidably retained over the lateral posts 20 of the strap frame 16. The slide bar 26 and the strap frame 16 cooperate to secure a strap 28, such as a seatbelt strap, within the strap passage 24.

The conventional buckle assembly 10 tends to allow the strap 28 to loosen or creep within the strap passage 24. For example, if oriented a particular way, the strap frame 16 may hang away from the structure 12. In this state, it is possible for the strap 28 to undesirably slacken or otherwise loosen within the strap passage 24.

Thus, a need exists for an improved buckle assembly that securely retains a strap. Further, a need exists for a buckle assembly that does not allow a strap retained therein to undesirably slacken.

SUMMARY OF THE INVENTION

Embodiments of the present invention provide a buckle assembly configured to be secured to a structure, such as a child car seat. The buckle assembly may include a clip, a strap frame, and at least one spring member.

The clip is configured to be secured to the structure. For example, the clip may be fastened to the structure through a bolt, screw, stitches, staples, glue, or the like.

The strap frame may include at least one motion-limiting tab, wherein the tab is configured to abut against a portion of the clip when the strap frame is rotated a maximum radial distance with respect to the clip. The strap frame may also include a clip cross bar integrally connected to lateral posts, which are in turn integrally connected to a strap cross bar. The clip cross bar may be rotatably secured to the clip.

The spring member may be a resilient piece of material that includes a first end fixed to the clip, and a second end that biases into at least a portion of the clip cross bar thereby exerting a constant force into the strap frame. The constant force maintains the strap frame in a generally flat orientation with respect to the structure.

Figure 1:
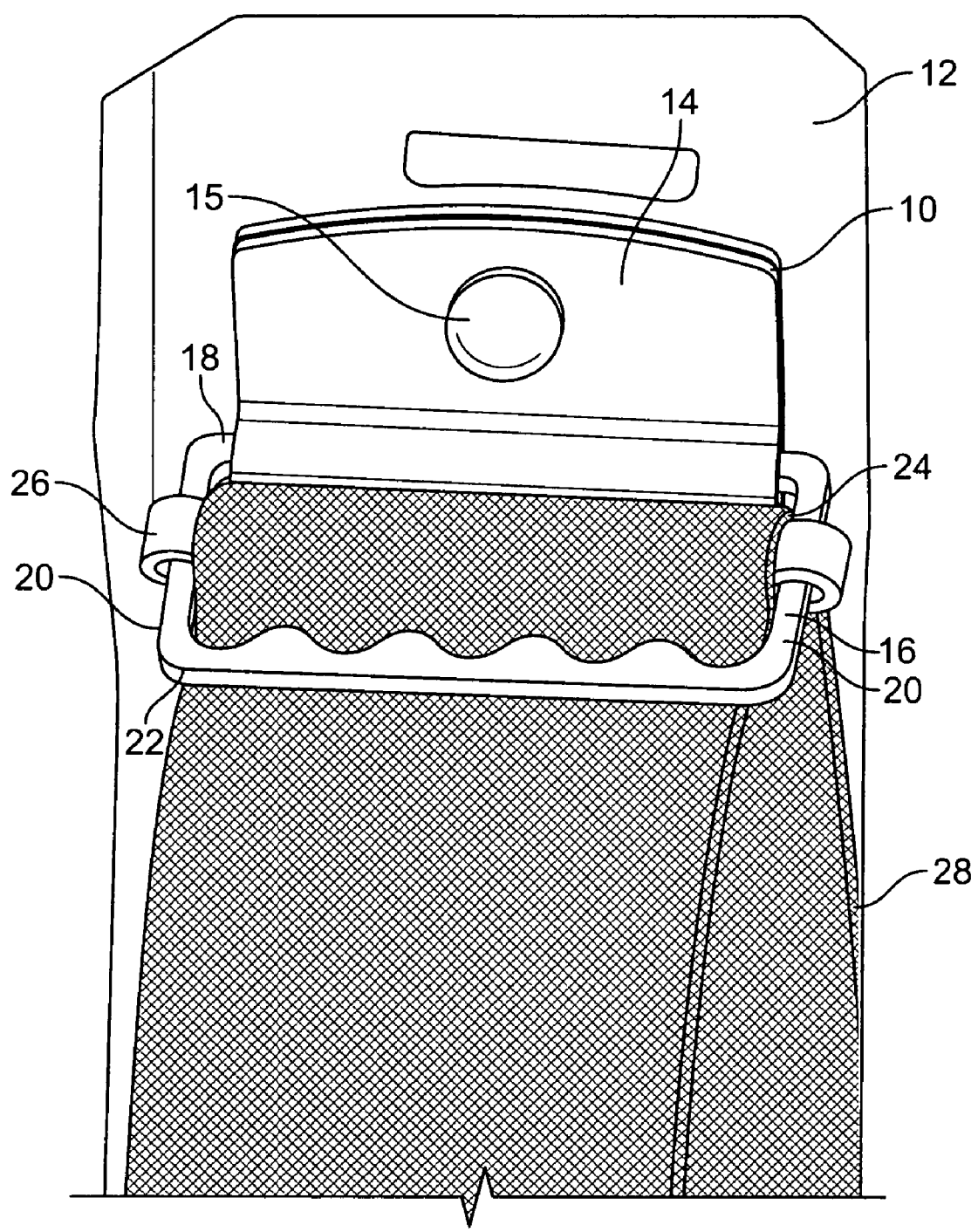
FIG. 1 illustrates a conventional buckle assembly secured to a structure, such as a car seat.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 2:
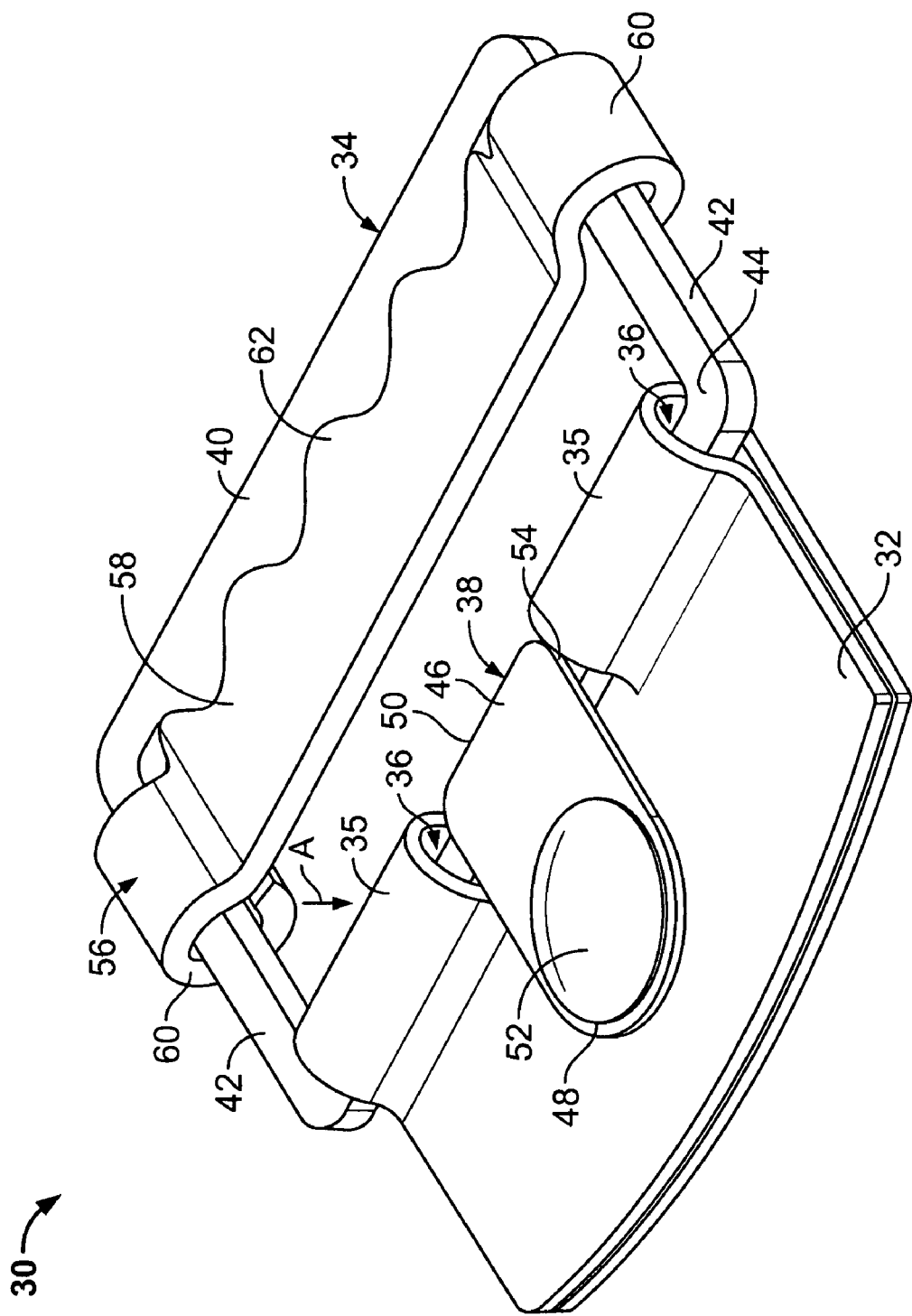
FIG. 2 illustrates an isometric front view of a buckle assembly according to an embodiment of the present invention.

FIG. 2 illustrates an isometric front view of a buckle assembly 30 according to an embodiment of the present invention. The buckle assembly 30 includes a clip 32, which is configured to be secured to a structure, and a strap frame 34, which is configured to securely retain a strap, such as a seat belt strap.

The clip 32 includes tubes, walls, or other such structures 35 having frame passages 36 formed therethrough. The tubes 35 are separated from one another by a spring-engaging area 38.

The strap frame 34 is a generally rectangular frame including a strap cross bar 40, integrally connected to lateral posts 42, which are in turn integrally connected to a clip cross bar 44. The clip cross bar 44 is rotatably secured to the clip 32 within the frame passages 36 of the tubes 35. The strap frame 34 may be a generally planar body having flat surfaces.

Alternatively, the strap frame 34 may include rounded surfaces. For example, the strap cross bar 40, the lateral posts 42, and the clip cross bar 44 may be cylindrical. Additionally, portions of the strap 34 may be flat, while other portions may be cylindrical. For example, the lateral posts 42 may be cylindrical while the clip cross bar 44 may be flat. In particular, a middle portion of the clip cross bar 44 may be flat.

A biasing spring 46 including a fixed clip end 48 and a free end 50 is secured to the clip 32 through a fastener 52, such as screw or bolt that also secures the clip 32 to a structure, such as a portion of a car seat. The biasing spring 46 may be a resilient piece of material such as flexible plastic, rubber, or the like that is spring biased. The free end 50 of the biasing spring 46 is positioned within the spring-engaging area 38 over a middle portion 54 of the clip bar 44 of the strap frame 34. The biasing spring 46 exerts a force into the middle portion 54 of the clip bar 44 in the direction of arrow A, thereby maintaining the clip bar 44, and therefore the strap frame 34, in a generally flat position with respect to a structure to which the clip 32 is attached. The biasing spring 46 maintains the strap frame 34 in an aligned orientation with respect to the clip 32. That is, the strap frame 34 is maintained generally parallel or coplanar with respect to the clip 32.

While FIG. 2 shows one biasing spring 46, the buckle assembly 30 may include additional biasing springs spaced apart from one another within additional spring-engaging areas formed between tubes that rotatably secure the strap frame 34.

A slide bar 56 having a main body 58 integrally connected to terminal slide members 60, such as tubes or hooks, is slidably positioned on the lateral posts 42 of the strap frame 34. That is, the slide members 60 are slidably retained on the lateral posts 42. The main body 58 includes a strap-engaging edge 62 that is serrated, curved, ribbed, or the like. The strap-engaging edge 62 and a corresponding edge of the strap cross bar 40 are configured to securely retain a strap, such as seat belt strap, therebetween.

Figure 3:
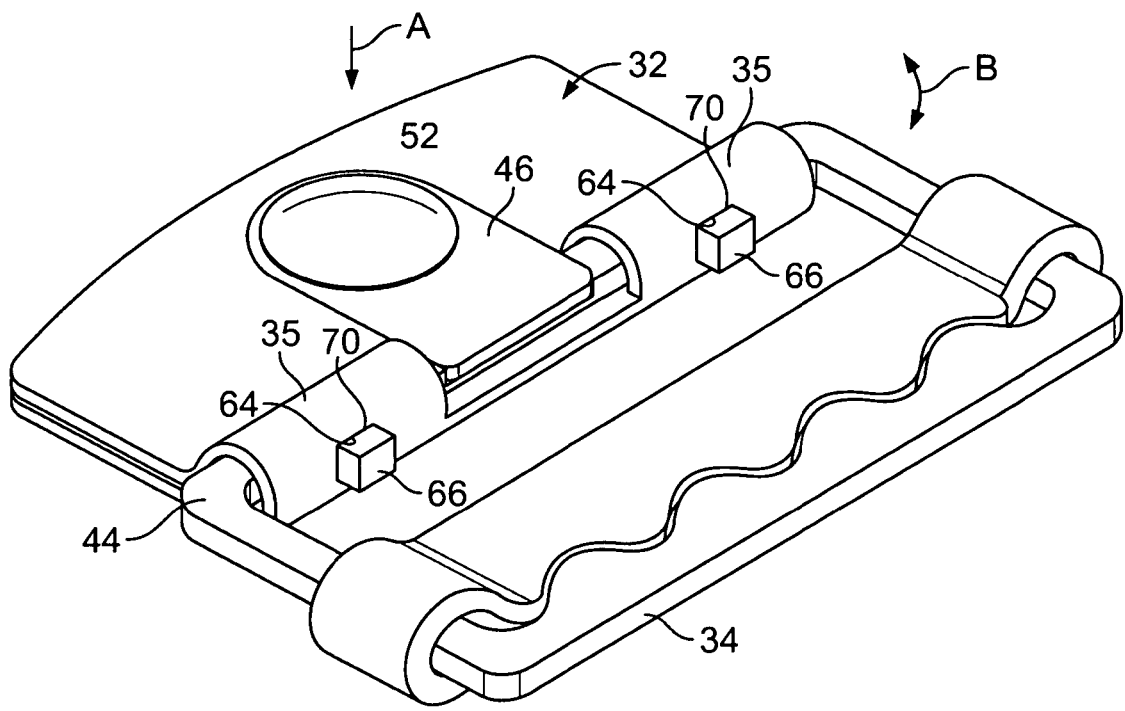
FIG. 3 illustrates an isometric rear view of a buckle assembly according to an embodiment of the present invention.

FIG. 3 illustrates an isometric rear view of the buckle assembly 30. As shown in FIG. 3, the tubes 35 also include tab passages 64 formed therethrough. Tabs 66 extending outwardly from the strap cross bar 44 extend through the tab passages 64. The tab passages 64 may be larger than the cross-sectional area of the tabs 66, thereby allowing limited movement of the tabs 66 within the tab passages 64. Thus, the strap frame 34 may be rotated with respect to the clip 32 in directions noted by arc B.

While the strap frame 34 may be rotated with respect to the clip 32, the force exerted into the strap frame 34 by the biasing spring 46 ensures that the strap frame 34 remains in a flat position, as discussed above. That is, while a user may rotate the strap frame 34 into an open position with respect to the clip 32, the biasing spring 46 ensures that the strap frame 34 is not rotated into an open position when a user is not engaging the strap frame 34.

Figure 4:
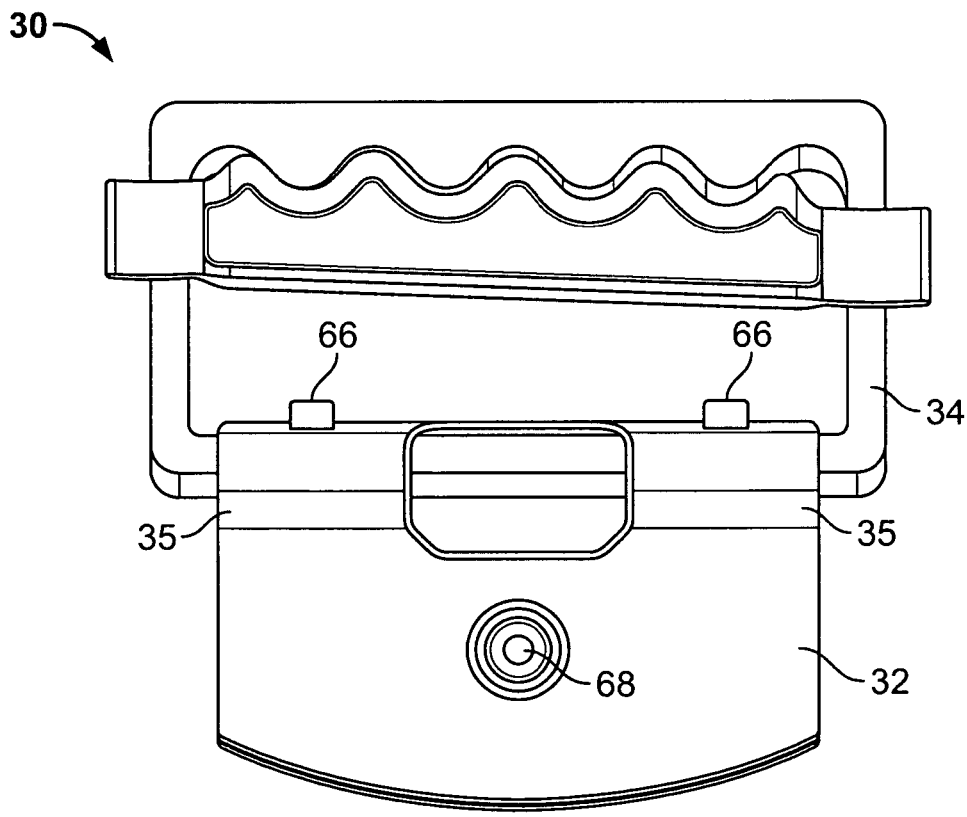
FIG. 4 illustrates a plan view of a buckle assembly without a biasing spring according to an embodiment of the present invention.

FIG. 4 illustrates a plan view of the buckle assembly 30 without the biasing spring 46. The clip 32 includes a fastener through hole 68 configured to receive and retain the fastener 52. As shown in FIG. 4, the tabs 66 pass through the tubes 35.

Figure 5:
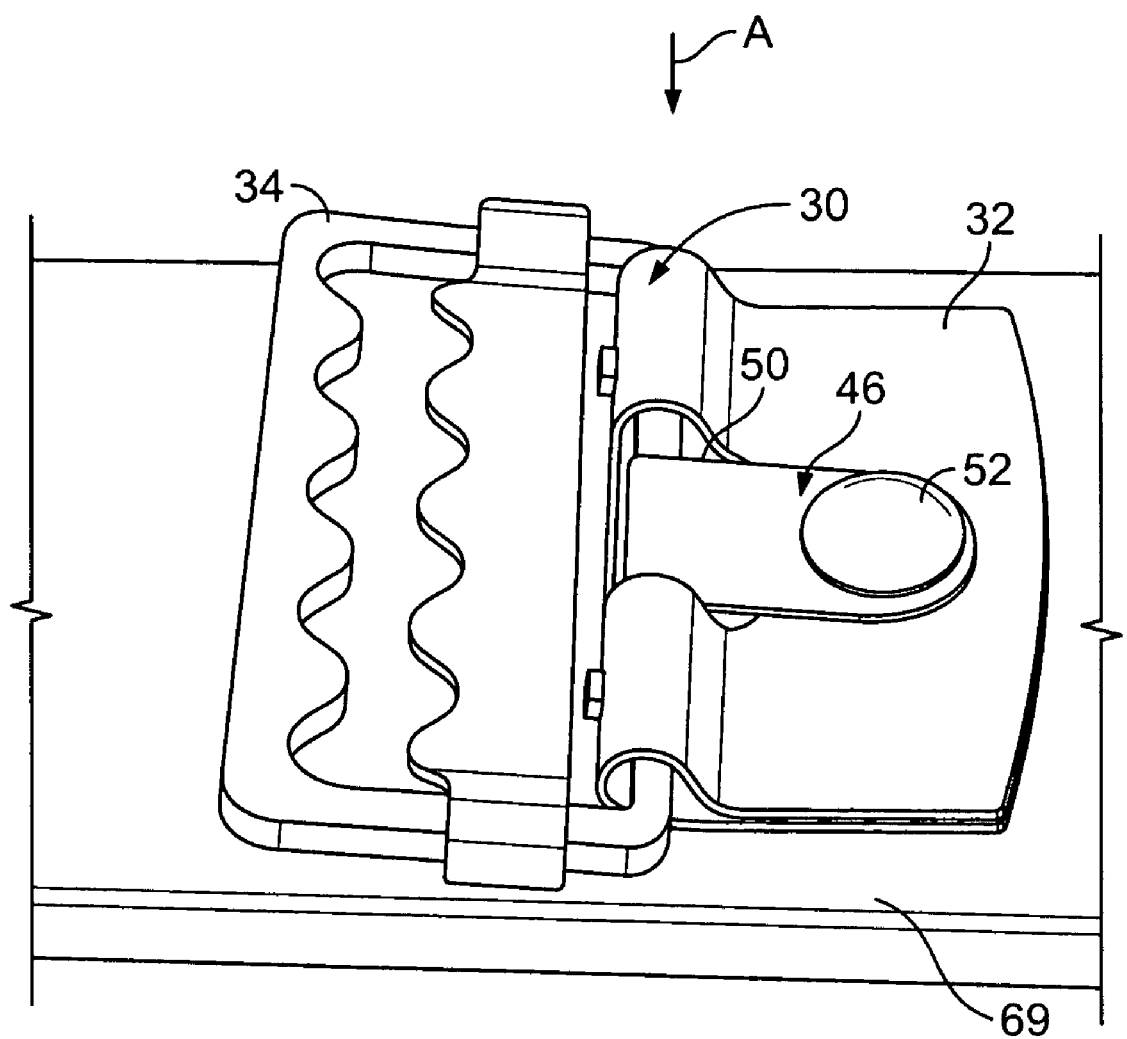
FIG. 5 illustrates an isometric view of a buckle assembly secured to a structure according to an embodiment of the present invention.

FIG. 5 illustrates an isometric view of the buckle assembly 30 secured to a structure 69, which may be a portion of a child car seat. The fastener 52 secures the clip 32 to the structure 69, and the biasing spring 46 to the clip 32. The free end 50 of the biasing spring 46 exerts a force into the strap frame 34, thereby maintaining the strap 34 in a substantially flat orientation (relative to a conventional buckle assembly) with respect to the structure 69.

Figure 6:
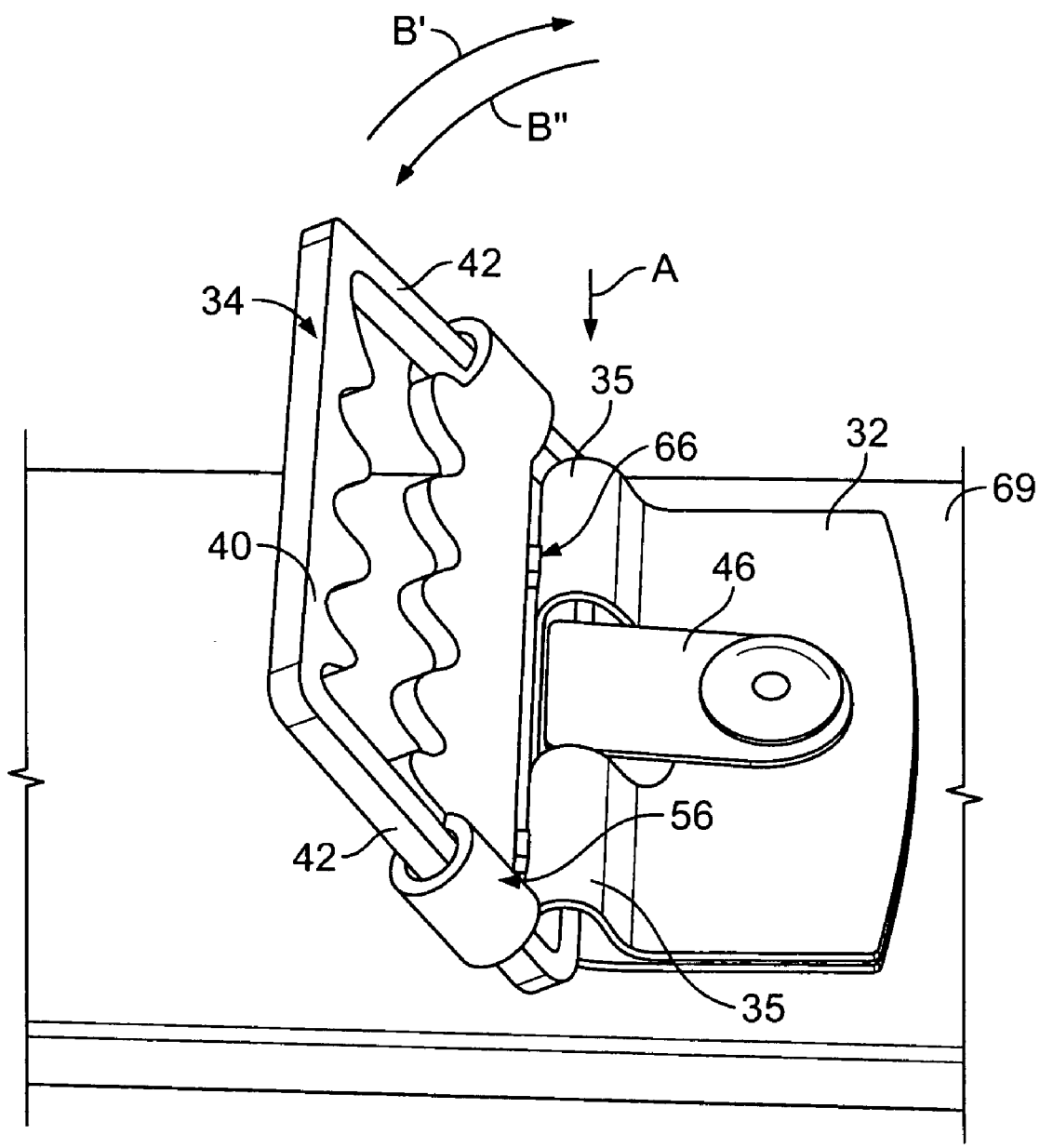
FIG. 6 illustrates an isometric view of a buckle assembly in an open position according to an embodiment of the present invention.

FIG. 6 illustrates an isometric view of the buckle assembly 30 in an open position. In order to open the buckle assembly 30, that is, rotate the strap frame 34 relative to the clip 32, a user manipulates the strap frame 34 through the strap cross bar 40 and lifts the strap frame 34 in the direction of arc B' to overcome the force exerted in the direction of arrow A by the spring member 46 into the strap member 46. In this position, the slide bar 56 may be moved freely over the lateral posts 42 in order to allow adjustment of a strap, such as a seatbelt strap, between the slide bar 56 and the strap frame 34.

Referring to FIGS. 3 and 6, as the strap frame 34 is urged into an open position, the tabs 66 move through the tab passages 68 in a similar direction. The tab passages 68 are sized to limit the movement of the tabs 66 therethrough. For example, the tab passages 68 may be sized to limit movement of the tabs 66 through a wide range of predetermined arcs. Thus, when the tabs 66 engage edges 70 of the tubes 35 that define the upper ends of the tube passages 68, continued movement of the tabs 66, and therefore the strap frame 34, in the direction of arc B' is prevented.

When the user disengages the strap cross bar 40, the constant force exerted by the biasing spring 46 into the strap frame 34 in the direction of arrow A forces the strap frame 34 back into a flat position.

Figure 7:
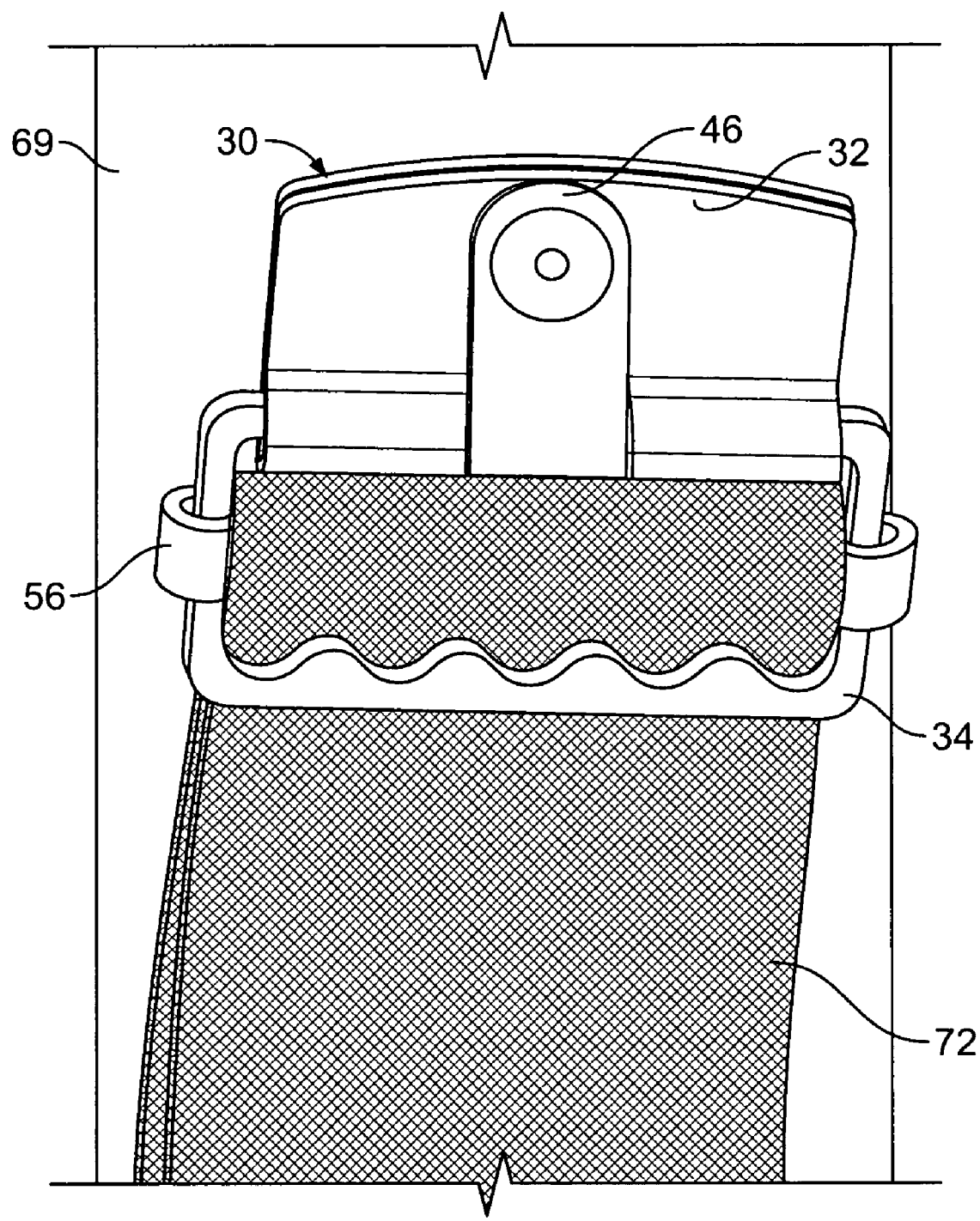
FIG. 7 illustrates an isometric view of a buckle assembly secured to a structure, such as a car seat, according to an embodiment of the present invention.

FIG. 7 illustrates an isometric view of the buckle assembly 30 secured to a structure 69, such as a car seat. A strap 72 is securely retained within the buckle assembly 30 by the strap frame 34 and the sliding bar 56. The biasing spring 46 maintains the strap frame 34 in a substantially flat position with respect to the structure 69. Therefore, the strap 72 remains securely retained within the buckle assembly 30.

Thus, embodiments of the present invention provide an improved buckle assembly that securely retains a strap therein. Additionally, embodiments of the present invention provide a buckle assembly that does not allow a strap retained therein to undesirably slacken.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A buckle assembly comprising:
    a clip configured to be secured to a structure;
    a strap frame rotatably secured to said clip;
    at least one spring member exerting a constant force into said strap frame, the constant force maintaining said strap frame in an aligned orientation with respect to said clip;
    wherein said at least one spring member comprises a first end fixed to said clip, and a second end that biases into at least a portion of said strap frame; and
    wherein said strap frame comprises a clip cross bar integrally connected to lateral posts, which are in turn integrally connected to a strap cross bar, wherein said clip cross bar is rotatably secured to said clip, and wherein said second end of said at least one spring member biases into said clip cross bar.

2. The buckle assembly of claim 1, wherein said clip comprises at least one tube having a frame passage, and wherein a portion of said clip cross bar is rotatably secured within said frame passage.

3. The buckle assembly of claim 1, wherein said strap frame includes flat surfaces.

4. The buckle assembly of claim 1, wherein said strap frame includes at least one tab, wherein said tab is configured to abut against a portion of said clip when said strap frame is rotated a maximum radial distance with respect to said clip.

5. The buckle assembly of claim 1, further comprising a slide bar slidably retained on said strap frame.

6. The buckle assembly of claim 5, further comprising a strap secured between said strap frame and said slide bar.

7. A buckle assembly configured to be secured to a structure, the buckle assembly comprising:

a clip configured to be secured to the structure;

a strap flame comprising a clip cross bar integrally connected to lateral posts, said lateral posts in turn being integrally connected to a strap cross bar, wherein said clip cross bar is rotatably secured to said clip;

a slide bar slidably retained on said strap frame; and at least one spring member comprising a first end fixed to said clip, and a second end that biases into at least a portion of said clip cross bar thereby exerting a constant force into said strap frame, the constant force maintaining said strap frame in an aligned orientation with respect to said clip.

8. The buckle assembly of claim 7, wherein said clip comprises at least one tube having a frame passage, and wherein a portion of said clip cross bar is rotatably secured within said frame passage.

9. The buckle assembly of claim 7, wherein said strap frame includes flat surfaces.

10. The buckle assembly of claim 7, wherein said strap frame includes at least one tab, wherein said tab is configured to abut against a portion of said clip when said strap frame is rotated a maximum radial distance with respect to said clip.

11. The buckle assembly of claim 7, further comprising a strap secured between said strap frame and said slide bar.

12. A buckle assembly configured to be secured to a structure, the buckle assembly comprising:

a clip configured to be secured to the structure;

a strap frame comprising: (i) at least one tab, wherein said tab is configured to abut against a portion of said clip when said strap frame is rotated a maximum radial distance with respect to said clip; (ii) a clip cross bar integrally connected to lateral posts, said lateral posts in turn being integrally connected to a strap cross bar, wherein said clip cross bar is rotatably secured to said clip; and at least one spring member comprising a first end fixed to said clip, and a second end that biases into at least a portion of said clip cross bar thereby exerting a constant force into said strap frame, the constant force maintaining said strap frame in a generally flat orientation with respect to the structure.

13. The buckle assembly of claim 12, wherein said clip comprises at least one tube having a frame passage, and wherein a portion of said clip cross bar is rotatably secured within said frame passage.

14. The buckle assembly of claim 12, wherein said strap frame includes flat surfaces.

15. The buckle assembly of claim 12, further comprising a strap secured between said strap frame and said slide bar.

16. The buckle assembly of claim 12, further comprising a slide bar slidably retained on said strap frame.

* * * * *